(12) United States Patent
Tomita et al.

(10) Patent No.: US 6,777,114 B2
(45) Date of Patent: Aug. 17, 2004

(54) SILICON CARBIDE-BASED POROUS BODY AND PROCESS FOR PRODUCTION THEREOF

(75) Inventors: Takahiro Tomita, Ogaki (JP); Shuichi Ichikawa, Handa (JP); Shinji Kawasaki, Nagoya (JP); Hiroaki Sakai, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/203,690

(22) PCT Filed: Nov. 12, 2001

(86) PCT No.: PCT/JP01/09856
§ 371 (c)(1),
(2), (4) Date: Aug. 13, 2002

(87) PCT Pub. No.: WO02/40423
PCT Pub. Date: May 23, 2002

(65) Prior Publication Data
US 2003/0021949 A1 Jan. 30, 2003

(30) Foreign Application Priority Data
Nov. 17, 2000 (JP) ........................................ 2000-350846

(51) Int. Cl.⁷ ................................................ B32B 3/12
(52) U.S. Cl. .................... 428/698; 428/116; 428/699; 428/402; 428/403; 428/446; 428/428; 428/317.9; 428/304.4; 264/628; 264/630; 264/653; 264/654; 264/660; 264/661; 264/669; 264/670; 264/682; 264/44
(58) Field of Search .................... 428/116, 698, 428/699, 402, 403, 446, 317.9, 428, 304.4; 264/603, 628, 629, 630, 653, 654, 660, 661, 669, 670, 682, 42, 43, 44

(56) References Cited

U.S. PATENT DOCUMENTS

| 4,902,459 A | * | 2/1990 | Matsubara et al. |
| 5,356,720 A | * | 10/1994 | Creber et al. |
| 5,482,778 A | * | 1/1996 | Aghajanian et al. |
| 5,935,515 A | * | 8/1999 | Hesse et al. |
| 5,962,103 A | * | 10/1999 | Luthra et al. |

FOREIGN PATENT DOCUMENTS

| JP | 63-8264 | 1/1988 |
| JP | 63-30386 | 2/1988 |
| JP | 2-172879 | 7/1990 |
| JP | 3-23283 | 1/1991 |
| JP | 5-17227 | 1/1993 |

OTHER PUBLICATIONS

JP 63–030386 English Abstract.*
JP 05–017227 Machine Translation.*

* cited by examiner

Primary Examiner—Deborah Jones
Assistant Examiner—Wendy Boss
(74) Attorney, Agent, or Firm—Parkhurst & Wendel, L.L.P.

(57) ABSTRACT

It is directed to a silicon carbide-based porous body, wherein said body is a porous one which contains silicon carbide particles as an aggregate and metallic silicon, and has an oxygen-containing phase at the surfaces of silicon carbide particles and/or metallic silicon or in the vicinity of the surfaces thereof. The silicon carbide-based porous body contains refractory particles such as silicon carbide particles or the like and yet can be produced at a relatively low firing temperature at a low cost, has a high thermal conductivity, and is superior in oxidation resistance, acid resistance, chemical resistance to ash and particulates.

22 Claims, 2 Drawing Sheets

SILICON CARBIDE-BASED POROUS BODY AND PROCESS FOR PRODUCTION THEREOF

TECHNICAL FIELD

The present invention relates to a silicon carbide-based porous body used in a filter for purification of automobile exhaust gas, a catalyst carrier, or the like, as well as to a process for production of such a silicon carbide-based porous body.

BACKGROUND ART

Porous honeycomb structures are in wide use as a filter for capturing and removing the particulate substance present in a dust-containing fluid (e.g. exhaust gas emitted from diesel engine), or as a catalyst carrier for loading thereon a catalyst component capable of purifying the harmful substances present in an exhaust gas. It is known that as a material constituting such a honeycomb structure, there are used refractory particles such as silicon carbide (SiC) particles and the like.

As a specific technique related thereto, there is disclosed, in, for example, JP-A-6-182228, a porous, silicon carbide-based catalyst carrier of honeycomb structure, obtained by using, as a starting material, a silicon carbide powder having a given specific surface area and a given impurity content, molding the material into a desired shape, drying the molded material, and firing the resulting material in a temperature range of 1,600 to 2,200° C.

Meanwhile, there are disclosed, in JP-A-61-26550, a process for producing a vitrifying material-containing refractory product, which comprises adding a vitrifying material to an easily oxidizable material or a refractory composition containing an easily oxidizable material, mixing, kneading and molding them together with a binder, and open-firing the molded material in a furnace containing a non-oxidative atmosphere; and, in JP-A-8-165171, a silicon carbide molded material obtained by adding, to a silicon carbide powder, an organic binder and inorganic binders of clay mineral series, glass series and lithium silicate series and molding the resulting material.

Also, in JP-A-6-182228 is introduced a process for producing a conventional porous, silicon carbide-based sintered body, which comprises adding, to silicon carbide particles as an aggregate, a binder such as vitreous flux, clayey material or the like, molding them, and firing the molded material at a temperature at which the binder melts.

Further, as to a high-temperature use ceramic filter produced by molding refractory particles which consist of silica sand, a ground pottery, a metal oxide (e.g. $Al_2O_3$, $TiO_2$ or $ZrO_2$), silicon carbide, nitride, boride, other refractory material, or the like and which are adjusted to a given grain size, to a porous, bottomed cylindrical material using a refractory binder such as water glass, frit, glaze or the like, there are disclosed, in JP-B-61-13845 and JP-B-61-13846, the preferred average particle diameter and particle size distribution of refractory particles, the preferred porosity, average pore diameter, pore volume and partition wall thickness of cylindrical material, etc. In the sintering (necking between particles) caused by the recrystallization of silicon carbide powder per se, shown in JP-A-6-182228, the silicon carbide component vaporizes from the surfaces of silicon carbide particles and the vaporized silicon carbide component condenses at the contact areas (necks) between silicon carbide particles; as a result, the necks grow and the particles are bonded to each other. There are problems, however, that this method brings a high cost since a very high firing temperature is required to be employed in order to vaporize silicon carbide, and that the yield after firing is reduced since a material of high thermal expansion coefficient is required to be fired at a high temperature as well.

Further in JP-A-2000-218165 are disclosed a honeycomb filter obtained by forming a silica film for increased strength, on the inner walls of the pores of a porous silicon carbide sintered body, and a process for production of such a honeycomb filter. This honeycomb filter has a sufficient mechanical strength but has yet undissolved problems in the production cost, thermal conductivity, etc.; therefore, the fluid thereof is desired.

Meanwhile, the technique of bonding a silicon carbide powder (as a raw material) with a vitreous material, shown in JP-A-61-26550 and JP-A-6-182228 uses a low firing temperature of 1,000 to 1,400° C.; however, when the sintered body produced by the technique is used, for example, as a diesel particulate filter (DPF) for removing the particulates contained in the exhaust gas emitted from a diesel engine and the particulates collected by and deposited on the filter are burnt for reactivation of the filter, there occurs local heat generation caused by the low thermal conductivity of the filter, which has incurred the destruction of the filter. Further, the filter shown in JP-B-61-13845 and JP-B-61–13846 is porous but is a bottomed cylindrical material having a large partition wall thickness of 5 to 20 mm; therefore, there is a problem that the filter is not usable under the high space velocity (SV) condition like as a filter for purification of automobile exhaust gas.

In order to solve the above problems, the present inventors propose, in Japanese Patent Application No. 2000–113513, a porous honeycomb structure containing refractory particles, in particular, silicon carbide as an aggregate and metallic silicon, and a process for production thereof. In the patent application, a honeycomb structure is proposed which can be produced at a relatively low firing temperature at a low cost and which has a high thermal conductivity, a sufficient porosity and a high specific surface area.

The honeycomb structure, however, may have problems depending upon the special environment in which it is used and the manner in which it is treated. For example, it is known that silicon carbide, when heated under a low oxygen partial pressure, gives rise to oxidative decomposition according to the following formula (1), resulting in reduced strength and oxidation resistance. It is also known that metallic silicon, when heated under a low oxygen content atmosphere, vaporizes or, as shown in the following formula (2), generates a SiO vapor. It is further known that these Si and SiO of gaseous state cause violent heat generation when they are oxidized or carbonized.

$$SiC + O_2 \rightarrow SiO\uparrow + CO\uparrow \quad (1)$$

$$Si + \tfrac{1}{2}O_2 \rightarrow SiO\uparrow \quad (2)$$

When a filter is burned for reactivation, oxygen is consumed; resultantly, the filter is exposed to a reducing atmosphere. Therefore, when a silicon carbide-based honeycomb filter having a structure bonded by metallic silicon is used as a DPF and then is reactivated, oxidation reactions under a low oxygen partial pressure, such as shown by the above formulas (1) and (2) may take place; and there has been a fear of, for example, the destruction of the filter caused by sharp temperature increase due to the oxidation of, in particular, metallic silicon.

Metallic silicon further has a property of easily dissolving in an acid when having no oxide film thereon. As a result, when a sintered body containing metallic silicon as a constituent is used as a DPF, the sintered body is exposed to an acidic gas atmosphere generated by the combustion of sulfur, etc. present in the fuel used; and there has been a fear, for example, the destruction of the filter caused by dissolution of metallic silicon.

In view of such a situation, the present invention aims at providing a silicon carbide-based porous body which contains refractory particles such as silicon carbide particles or the like and yet can be produced at a relatively low firing temperature at a low cost and which has a high thermal conductivity and is improved in oxidation resistance, acid resistance, chemical resistance to ash and particulates, and thermal shock resistance; a honeycomb structure which can be suitably used, for example, as a filter for purification of automobile exhaust gas by a treatment such as clogging of through-channels at its inlet or outlet, or as a catalyst carrier, even under a high SV condition; and a process for producing such a honeycomb structure.

Disclosure of the Invention

According to the present invention, there is provided a silicon carbide-based porous body, characterized in that said body is a porous one which contains silicon carbide particles as an aggregate and metallic silicon, and has an oxygen-containing phase at the surfaces of silicon carbide particles and/or metallic silicon or in the vicinity of the surfaces thereof.

In the present invention, the oxygen content is preferably 0.03 to 15% by weight; the oxygen-containing phase is preferably amorphous and/or crystalline $SiO_2$ or $SiO$; and the following relation is satisfied:

$$A/B \geq 1.3$$

when the strength is taken as A (MPa) and the Young's modulus is taken as B (GPa).

According to the present invention, there is also provided a honeycomb structure constituted by any of the above silicon carbide-based porous bodies.

Meanwhile, according to the present invention, there is provided a process for producing a silicon carbide-based porous body, characterized by adding metallic silicon and an organic binder to raw material silicon carbide particles, mixing them, molding the mixture to a predetermined shape, calcinating the molded material in an oxygen-containing atmosphere to remove the organic binder in the molded material, and firing the calcinated material to obtain a silicon carbide-based porous body wherein an oxygen-containing phase is formed at the surfaces of the silicon carbide particles and/or the metallic silicon or in the vicinity of the surfaces thereof.

According to the present invention, there is also provided a process for producing a silicon carbide-based porous body, characterized by adding metallic silicon and an organic binder to raw material silicon carbide particles, mixing them, molding the mixture to a predetermined shape, calcinating the molded material to remove the organic binder in the molded material, firing the calcinated material, and subjecting the fired material to a heat treatment in an oxygen-containing atmosphere to obtain a silicon carbide-based porous body wherein an oxygen-containing phase is formed at the surfaces of the silicon carbide particles and/or the metallic silicon or in the vicinity of the surfaces thereof.

In the above present invention, the heat treatment is carried out preferably in a temperature range of 500 to 1,400° C.

According to the present invention, there is further provided a process for producing a silicon carbide-based porous body, characterized by adding metallic silicon and an organic binder to raw material silicon carbide particles, mixing them, molding the mixture to a predetermined shape, calcinating the molded material to remove the organic binder in the molded material, firing the calcinated material, then coating the surfaces of the silicon carbide particles and the metallic silicon with a fluid containing silicon and oxygen, thereafter subjecting the resulting material to a heat treatment to obtain a silicon carbide-based porous body wherein an oxygen-containing phase is formed at the surfaces of the silicon carbide particles and/or the metallic silicon or in the vicinity of the surfaces thereof. In the aforementioned present invention, the heat treatment is carried out preferably in a temperature range of 50 to 1,400° C.

In each of the above-mentioned present processes for producing a silicon carbide-based porous body, the firing is carried out preferably in a temperature range of 1,410 to 1,600° C.

BEST MODE FOR CARRYING OUT THE INVENTION

Figure 1:
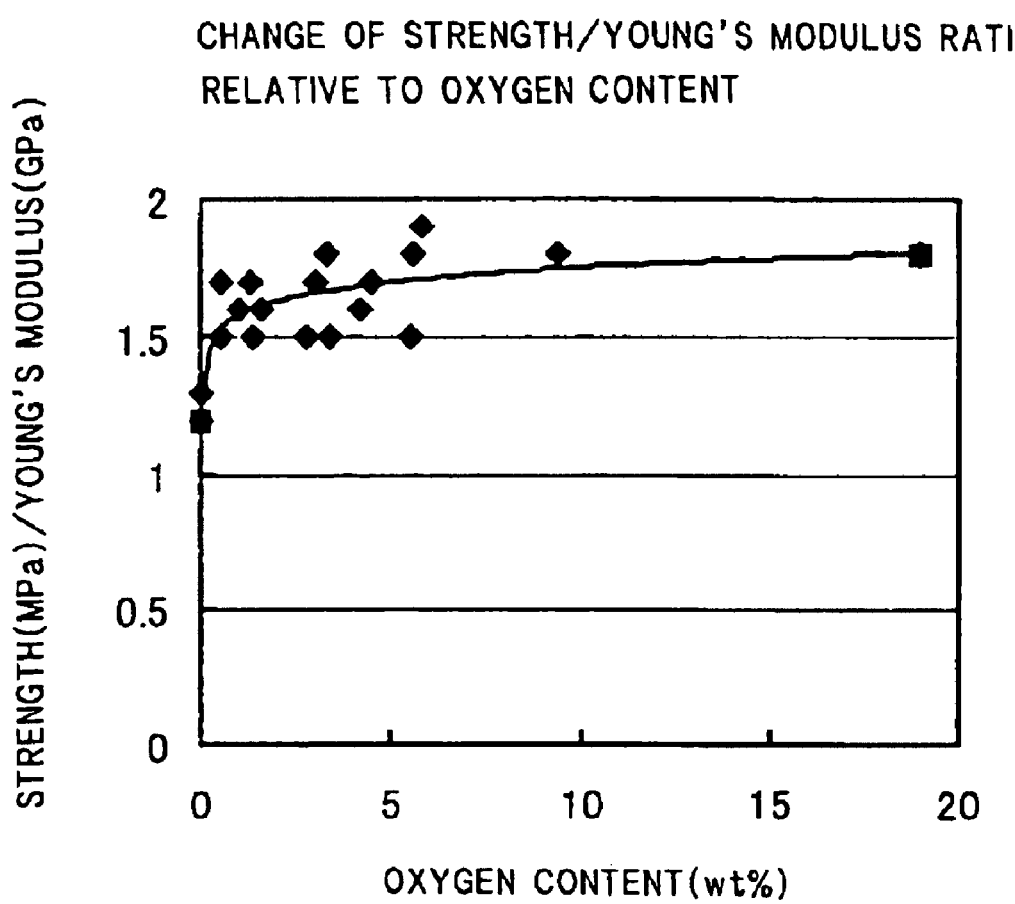
FIG. 1 is a graph obtained by plotting the strength (MPa)/Young's modulus (GPa) ratios of honeycomb structures against the oxygen contents (weight %) in the honeycomb structures.

The mode for carrying out the present invention is described below. However, it should be understood that the present invention is not restricted to the following mode alone and can be appropriately subjected to design change, improvement, etc. based on the ordinary knowledge of those skilled in the art, as long as there is no deviation from the scope of the present invention.

The silicon carbide-based porous body of the present invention contains silicon carbide particles as an aggregate and metallic silicon; therefore, it can be produced at a relatively low firing (sintering) temperature, at a low cost and at an improved yield. Further, the present silicon carbide-based porous body uses metallic silicon for bonding between silicon carbide particles which are refractory particles; therefore, it has a high thermal conductivity as compared with conventional structures using a vitreous material for bonding between refractory particles and accordingly, when used, for example, as a DPF and subjected to combustion of the particulates deposited on the filter, for filter reactivation, there occurs no local temperature increase as to damage the filter.

Furthermore, the present silicon carbide-based porous body contains an oxygen-containing phase at the surface of the silicon carbide particles and/or the metallic silicon or in the vicinity of the surface; therefore, even when it is exposed to such a low-oxygen content atmosphere and high temperatures as experienced when used as a DPF, the oxidative decomposition of the silicon carbide and the metallic silicon is suppressed. Thus, the silicon carbide-based porous body of the present invention has improved oxidation resistance; therefore, it undergoes, when used as a filter and subjected to reactivation, no damage due to the heat generated, for example, by the oxidation of the silicon carbide and the metallic silicon. Such an effect is obtained not only when the oxygen-containing phase is present on the surface of the silicon carbide particles and/or the metallic silicon but also when the oxygen-containing phase is present in the vicinity of the surface.

The oxygen content in the silicon carbide-based porous body of the present invention is preferably 0.03 to 15% by weight, more preferably 0.5 to 10% by weight, particularly preferably 1.0 to 8.0% by weight. When the oxygen content is less than 0.03% by weight, there is substantially no oxide film; as a result, the oxidation of the silicon carbide or the metallic silicon takes place easily and there may appear, for example, the damage of filter caused by the dissolution of the metallic silicon in an acidic gas or the like; therefore, such an oxygen content is not preferred. When the oxygen content is more than 15% by weight, the metallic silicon is oxidized and the bonded areas between silicon carbide particles become $SiO_2$, resulting in a reduction in thermal conductivity; therefore, such an oxygen content is not preferred, either. Incidentally, when the honeycomb structure of the present invention is used as a DPF, its thermal conductivity is sufficient at about 10 W/mK or more in order to avoid the local temperature increase of the filter during the reactivation.

In the silicon carbide-based porous body of the present invention, the oxygen-containing phase is preferred to be amorphous and/or crystalline $SiO_2$ or SiO. Owing to the presence of a phase having such a composition, on the surface of the silicon carbide particles and/or the metallic silicon or in the vicinity of the surface, the porous body of the present invention is effectively improved in oxidation resistance, acid resistance, chemical resistance to ash and particulates and thermal shock resistance.

The silicon carbide-based porous body of the present invention preferably satisfies a relation of $A/B \geq 1.3$, more preferably a relation of $A/B \geq 1.4$, further preferably a relation of $A/B \geq 1.45$ when the strength of the porous body is taken as A (MPa) and the Young's modulus thereof is taken as B (GPa). An A/B of less than 1.3 is not preferred because the resulting porous body has a low thermal shock resistance. Therefore, the silicon carbide-based porous body of the present invention whose A/B is specified in the above range, is superior in thermal shock resistance.

Meanwhile, the honeycomb structure according to the present invention is characterized by being constituted by the above-mentioned silicon carbide-based porous body of the present invention. Reflecting the properties of the silicon carbide-based porous body which is a constituent, the honeycomb structure possesses superior oxidation resistance, acid resistance, chemical resistance to ash and particulates and thermal shock resistance. Further, the present honeycomb structure is not a bottomed cylindrical material of large wall thickness such as shown in JP-B-61-13845 and JP-B-61-13846 but a porous honeycomb structure and, therefore, can be used, for example, as a DPF for collecting and removing the particulates emitted from a diesel engine or as a catalyst carrier, under a high SV condition.

Next, description is made on a process for producing a silicon carbide-based porous body of the present invention. In producing the silicon carbide-based porous body of the present invention, first, metallic silicon and an organic binder are added to silicon carbide particles, and they are mixed to obtain a mixed powder. Or, when the silicon carbide-based porous body is produced in the shape of a honeycomb structure, metallic silicon and an organic binder are added to silicon carbide particles and they are mixed and kneaded to obtain a readily formable puddle. The raw materials for the silicon carbide particles and the metallic silicon contain a very small amount of impurities such as Fe, Al, Ca and the like in some cases; however, they may be used per se or after purification by chemical treatment such as chemical washing or the like. When the honeycomb structure is used as a filter, various pore-formers may be added at the time of preparation of the readily formable puddle in order to obtain a higher porosity.

The above-obtained mixed powder or readily formable puddle is molded into a predetermined shape such as honeycomb shape or the like; the molded material is calcinated in an oxygen-containing atmosphere to remove the organic binder in the molded material, for debindering; then, firing is conducted; thereby can be produced a silicon carbide-based porous body of predetermined shape wherein an oxygen-containing phase is formed at the surface of the silicon carbide particles and/or the metallic silicon or in the vicinity of the surface.

Therefore, by conducting calcination in an oxygen-containing atmosphere as mentioned above, oxidation reactions proceed according to, for example, the following formulas (3) and (4), whereby an oxide film of silica is formed.

Next, other process for producing a silicon carbide-based porous body according to the present invention is described. That is, the above-mentioned mixed powder or readily formable puddle is molded into a predetermined shape such as honeycomb shape or the like; the molded material is calcinated to remove the organic binder in the molded material, for debindering; then, firing is conducted; further, a heat treatment is carried out in an oxygen-containing atmosphere; thereby can be produced a silicon carbide-based porous body of predetermined shape wherein an oxygen-containing phase is formed at the surface of the silicon carbide particles and/or the metallic silicon or in the vicinity of the surface.

Incidentally, in the above process for producing a silicon carbide-based porous body according to the present invention, the heat treatment in an oxygen-containing atmosphere is carried out preferably at 500 to 1,400° C., more preferably at 550 to 1,350° C., further preferably at 600 to 1,300° C. When the heat treatment is carried out below 500° C., the formation of the oxygen-containing phase is insufficient; when the heat treatment is carried out above 1400° C., the heat treatment temperature is close to the melting point of metallic silicon and the fired material may be unable to hold the shape; therefore, such heat treatment temperatures are not preferred. Thus, according to the process for producing a silicon carbide-based porous body according to the present invention wherein the heat treatment temperature is specified as above, an oxygen-containing phase can be effectively formed on the surfaces of the silicon carbide particles and the metallic silicon.

Next, still other process for producing a silicon carbide-based porous body according to the present invention is described. That is, the above-mentioned mixed powder or readily formable puddle is molded into a predetermined shape such as honeycomb shape or the like; the molded material is calcinated to remove the organic binder in the molded material, for debindering; then, firing is conducted; further, a fluid containing silicon and oxygen is coated on the surfaces of the silicon carbide particles and the metallic silicon both constituting the molded material. Thereafter, a heat treatment is conducted, whereby can be produced a silicon carbide-based porous body of predetermined shape wherein an oxygen-containing phase is formed at the surfaces of the silicon carbide particles and the metallic silicon or in the vicinity of the surfaces. Thus, an intended silicon carbide-based porous body can also be produced by using a coating fluid containing silicon and oxygen, unlike the case for forming an oxygen-containing phase by oxidation.

As the fluid containing silicon and oxygen, there can be used a fluid composed mainly of, for example, a silicon alkoxide, a silica sol, water glass or the like. These main components may be mixed as necessary. The heat treatment after coating can be conducted at 50 to 1,400° C. for 10 minutes to 4 weeks. The thickness of the oxygen-containing phase formed by coating can be controlled appropriately by adjusting the silicon concentration in the fluid. The thickness of the phase can be made large by repeating the immersion in the fluid and the subsequent drying. The thickness of the phase can be controlled also by controlling the speed of taking out the to-be-coated material from the fluid.

In the above process for producing a silicon carbide-based porous body according to the present invention, the heat treatment conducted after the coating of the surfaces of the silicon carbide particles and the metallic silicon after the firing is carried out preferably at 50 to 1,400° C., more preferably at 100 to 1,300° C., further preferably at 150 to 1,200° C. When the heat treatment is carried out below 50° C., a long time is required before an oxygen-containing phase is formed sufficiently on the surfaces of the silicon carbide particles and the metallic silicon; when the heat treatment is carried out above 1,400° C., the heat treatment temperature is close to the melting point of the metallic silicon and the to-be-heated material may be unable to hold the shape; therefore, such heat treatment temperatures are not preferred. Thus, according to the process for producing a silicon carbide-based porous body according to the present invention wherein the heat treatment temperature is specified as above, an oxygen-containing phase can be effectively formed on the surfaces of the silicon carbide particles and the metallic silicon.

In the process for producing a silicon carbide-based porous body according to the present invention, calcination is carried out preferably at a temperature lower than the melting point of the metallic silicon. Specifically, the calcination may be conducted by once keeping the material to be calcinated, at a predetermined temperature of about 150 to 700° C., or by using a small temperature elevation rate of 50° C. /hr or less in a predetermined temperature range. When the calcination is conducted by once keeping the to-be-calcinated material at a predetermined temperature, the predetermined temperature may be one temperature level or may be a plurality of temperature levels depending upon the kind and amount of the organic binder used; when the to-be-calcinated material is kept at a plurality of temperature levels, the times of keeping at these temperature levels may be the same or different. When the calcination is conducted by using a small temperature elevation rate, the small temperature elevation rate may be used only in one temperature range or in a plurality of temperature ranges; when the small temperature elevate rate is used in a plurality of temperature ranges, the temperature elevation rates in these temperature ranges may be the same or different.

In order to obtain a structure in which the refractory particles are bonded by the metallic silicon, the metallic silicon must soften. Since the melting point of the metallic silicon is 1,410° C., the firing temperature used in the firing is preferably 1,410° C. or more. The optimum firing temperature is determined from the fine structure and properties required for the fired material. However, when the firing temperature is higher than 1,600° C., the metallic silicon vaporizes, making difficult the bonding between the silicon carbide particles via the metallic silicon; therefore, the firing temperature is appropriately 1,410 to 1,600° C., preferably 1,420 to 1,580° C.

Incidentally, the production processes employing recrystallization, shown in the above-mentioned JP-A-6-182228 and JP-A-2000-218165 enable bonding between silicon carbide particles and produce a sintered body of high thermal conductivity; however, since sintering is allowed to take place by vaporization and condensation, as mentioned previously, and silicon carbide is vaporized, a firing temperature higher than that used in the present production process is needed and firing at 1,800° C. or mores ordinarily at 2,000° C. or more is necessary in order to obtain a silicon carbide sintered body which is usable practically. Meanwhile, the silicon carbide-based porous body according to the present invention is entirely different from the above-mentioned conventional silicon carbide sintered bodies in that in the present silicon carbide-based porous body, the silicon carbide particles as a constituent are bonded with each other via the metallic silicon also as a constituent. That is, since the metallic silicon acts as a binder, a relation of A/B≧1.3 is attained in the present silicon carbide-based porous body when the strength of the porous body is taken as A (MPa) and the Young's modulus thereof is taken as B (GPa). That is, the relation of A/B>1.3 is not attained in the case of the above-mentioned conventional silicon carbide sintered bodies; thus, in the case of the present inventive silicon carbide-based porous body and the process for production thereof, one may say that a consideration is made also to the production cost, and that the present invention can provide a silicon carbide-based porous body superior also in thermal shock resistance, and a honeycomb structure constituted by the porous body.

The present invention is described in more detail below by way of Examples. However, the present invention is in no way restricted to these Examples.

EXAMPLE 1

A SiC raw material powder having an average particle diameter of 32.6 µm and a metallic Si powder having an average particle diameter of 4 µm were compounded at a weight ratio of 80:20. To 100 parts by weight of the resulting powder were added 6 parts by weight of methyl cellulose as an organic binder, 2.5 parts by weight of a surfactant and 24 parts by weight of water. They were mixed and kneaded uniformly to obtain a readily formable puddle. The readily formable puddle was molded, using an extruder, into a honeycomb shape having an outer diameter of 45 mm, a length of 120 mm, a partition wall thickness 0.43 mm and a cell density of 100 cells/in.$^2$ (16 cells/cm$^2$).

The honeycomb molded material was calcinated for debindering, in a low-oxygen content atmosphere at 550° C. for 3 hours and then fired in a non-oxidative atmosphere of reduced pressure at 1,450° C. for 2 hours, to obtain a silicon carbide sintered body of porous honeycomb structure. The crystal phase of the sintered body was examined by X-ray diffraction, which confirmed that the sintered body was composed of SiC, Si and a small amount of SiO$_2$.

EXAMPLE 2

The operation up to molding was conducted in the same manner as in Example 1. The resulting honeycomb molded material was kept at 550° C. for 5 hours while air was allowed to flow; then, the air was switched to Ar and the temperature was increased to 1,000° C. to conduct calcination for debindering, while keeping it as it was. Thereafter, firing was conducted in an Ar atmosphere at 1,450° C. for 2 hours to produce a silicon carbide sintered body of porous honeycomb structure. The crystal phase of the sintered body was examined by X-ray diffraction, which confirmed that the sintered body was composed of SiC, Si and SiO$_2$.

EXAMPLES 3 TO 9

The operation up to molding was conducted in the same manner as in Example 1. The resulting honeycomb molded material was calcinated for debindering, in a low-oxygen content atmosphere at 550° C. for 3 hours and then firing was conducted in a non-oxidative atmosphere of reduced pressure at 1,450° C. for 2 hours to produce silicon carbide sintered bodies of porous honeycomb structure.

Each sintered body was heat-treated in air at 1,000 to 1,300° C. for 2 to 24 hours. There was no macroscopic or microscopic change in the honeycomb structures before and after the heat treatment. The crystal phase of each sintered body after the heat treatment was examined by X-ray diffraction, which confirmed that the sintered body after the heat treatment was composed of SiC, Si and SiO$_2$.

EXAMPLES 10 TO 15

The operation up to molding was conducted in the same manner as in Example 1. The resulting honeycomb molded material was calcinated for debindering, in a low-oxygen content atmosphere at 550° C. for 3 hours and then firing was conducted in a non-oxidative atmosphere at 1,450° C. for 2 hours to produce silicon carbide sintered bodies of porous honeycomb structure.

Each sintered body was heat-treated in air at 1,000 to 1,300° C. for 2 to 24 hours. There was no macroscopic or microscopic change in the honeycomb structures before and after the heat treatment. The crystal phase of each sintered body after the heat treatment was examined by X-ray diffraction, which confirmed that the sintered body after the heat treatment was composed of SiC, Si and SiO$_2$.

EXAMPLES 16 AND 17

The operation up to firing was conducted in the same manner as in Examples 3 to 9, to produce silicon carbide sintered bodies of porous honeycomb structure. Then, each sintered body was immersed in a silica sol (SiO$_2$ content: 4 or 20% by weight) and taken out slowly to coat the sintered body with the silica sol. Successively, each coated sintered body was heat-treated in air at 750° C. for 1 hour to produce silica-coated silicon carbide sintered bodies of porous honeycomb structure.

There was no macroscopic or microscopic change in the honeycomb structures before and after the silica coating. The crystal phase of each sintered body after the silica coating was examined by X-ray diffraction, which confirmed that the sintered body after the silica coating was composed of SiC, Si and SiO$_2$.

COMPARATIVE EXAMPLE 1

The operation up to molding was conducted in the same manner as in Example 1. The resulting honeycomb molded material was kept in an non-oxidative atmosphere of reduced pressure at 550° C. for 5 hours and then fired, as it was, at 1,450° C. for 2 hours to produce a silicon carbide sintered body of porous honeycomb structure. The crystal phase of the sintered body was examined by X-ray diffraction, which confirmed that the sintered body was composed of SiC and Si.

COMPARATIVE EXAMPLE 2

The operation up to firing was conducted in the same manner as in Examples 10 to 15 to produce silicon carbide sintered bodies of porous honeycomb structure. Then, each sintered body was heat-treated in air at 1,410° C. for 4 hours. There was no macroscopic or microscopic change in the honeycomb structures before and after the heat treatment. The crystal phase of the sintered body after the heat treatment was examined by X-ray diffraction, which confirmed that the material was composed of SiC and $SiO_2$.

(Test on Physical Characteristics)

Test pieces were cut out from each of the sintered bodies produced in the above Examples 1 to 17 and Comparative Examples 1 to 2 and measured for oxygen content by infrared spectroscopy after melting them in inert gas. The test pieces were also measured for strength by a three-point bending test under room temperature using a material tester and for Young's modulus (determined from the relation of stress and strain) by a static elastic modulus test method; then, a strength/Young's modulus ratio was calculated. Measurement and calculation were also made for thermal conductivity by a laser flash method and for the amount dissolved in acid from the weight change of test piece when the test piece was immersed in 10 wt. % sulfuric acid at 80° C. for 50 hours. The results are shown in Table 1. In Table 1, "characteristic step of production process" refers to a step for forming an oxygen-containing phase in Examples 1 to 17 and Comparative Example 1 and, in Comparative Example 1, refers to a calcination and firing step.

Figure 2:
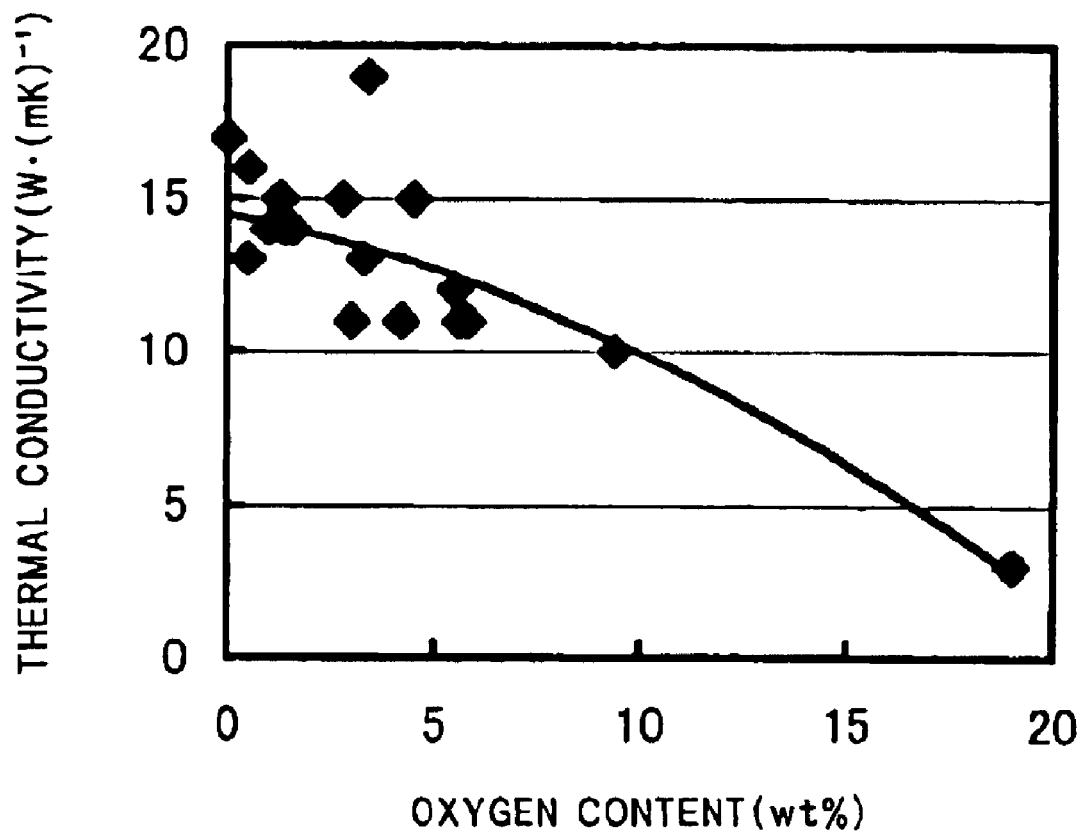
FIG. 2 is a graph obtained by plotting the thermal conductivities (W·(mK)−1) of honeycomb structures against the oxygen contents (weight %) in the honeycomb structures.

Further, each test piece was heated to 1,400° C. in a low-oxygen content atmosphere, i.e., an atmosphere of high-purity He flow to visually observe the vaporization and oxidation of Si. Metallic silicon turns white when oxidized; therefore, the vaporization and oxidation of Si was rated as "yes" when the test piece turned white, because the oxidation of silicon was judged to have taken place and as "no" when the test piece showed no discoloration, because there was judged to be no oxidation of silicon. The results are shown in Table 1. In FIG. 1 is shown a graph obtained by plotting the strength/Young's modulus ratios of honeycomb structures against the oxygen contents in the honeycomb structures. In FIG. 2 is shown a graph obtained by plotting the thermal conductivities of honeycomb structures against the oxygen contents in the honeycomb structures.

TABLE 1

| | Characteristic step of production process | Oxygen content (wt. %) | Strength (MPa)/ Young's modulus (GPa) ratio | Amount dissolved in acid (wt. %) | Thermal conductivity (W/mK) | Vaporization and oxidation of Si |
|---|---|---|---|---|---|---|
| Example 1 | Calcination in low-oxygen content atmosphere | 0.03 | 1.3 | 0 | 17 | No |
| Example 2 | Calcination in air flow | 1.4 | 1.5 | 0 | 14 | No |
| Example 3 | Heat treatment after firing: 1000° C. × 2 hr | 0.5 | 1.7 | 0 | 13 | NO |
| Example 4 | Heat treatment after firing: 1000° C. × 6 hr | 1.3 | 1.7 | 0 | 15 | No |
| Example 5 | Heat treatment after firing: 1100° C. × 6 hr | 1.6 | 1.6 | 0 | 14 | No |
| Example 6 | Heat treatment after firing: 1200° C. × 6 hr | 2.8 | 1.5 | 0 | 15 | No |
| Example 7 | Heat treatment after firing: 1200° C. × 12 hr | 3.4 | 1.5 | 0 | 19 | No |
| Example 8 | Heat treatment after firing: 1200° C. × 24 hr | 5.5 | 1.5 | 0 | 12 | No |
| Example 9 | Heat treatment after firing: 1300° C. × 6 hr | 4.5 | 1.7 | 0 | 15 | No |
| Example 10 | Heat treatment after firing: 1000° C. × 6 hr | 3.0 | 1.7 | 0 | 11 | No |
| Example 11 | Heat treatment after firing: 1100° C. × 6 hr | 3.3 | 1.8 | 0 | 13 | No |
| Example 12 | Heat treatment after firing: 1200° C. × 6 hr | 4.2 | 1.6 | 0 | 11 | No |
| Example 13 | Heat treatment after firing: 1200° C. × 12 hr | 5.8 | 1.9 | 0 | 11 | No |
| Example 14 | Heat treatment after firing: 1200° C. × 24 hr | 9.4 | 1.8 | 0 | 10 | No |

TABLE 1-continued

| | Characteristic step of production process | Oxygen content (wt. %) | Strength (MPa)/ Young's modulus (GPa) ratio | Amount dissolved in acid (wt. %) | Thermal conductivity (W/mK) | Vaporization and oxidation of Si |
|---|---|---|---|---|---|---|
| Example 15 | Heat treatment after firing: 1300° C. × 6 hr | 5.6 | 1.8 | 0 | 11 | No |
| Example 16 | Composition of coating fluid: SiO$_2$ 20 wt. % | 1.0 | 1.6 | 0 | 14 | No |
| Example 17 | Composition of coating fluid: SiO$_2$ 4 wt. % | 0.54 | 1.5 | 0 | 16 | No |
| Comparative Example 1 | Calcination and firing under reduced pressure | <0.01 *1 | 1.2 | 0.2 | 17 | Yes |
| Comparative Example 2 | Heat treatment after firing: 1410° C. × 4 hr | 19.0 | 1.8 | 0 | 3 | No |

*1: Below the detection limit

As is clear from Table 1, there was an increase in oxidation resistance by forming an oxygen-containing phase at the surface of silicon carbide particles and/or metallic silicon or in the vicinity of the surface. As is clear from Table 1 and FIG. 1, there was also an increase in strength/Young's modulus ratio. It can be confirmed from Table 1 that as to acid resistance, there is no problem regardless of the oxygen content level in honeycomb structure.

Meanwhile, as is clear from Table 1 and FIG. 2, thermal conductivity tends to decrease with an increase in oxygen content in honeycomb structure. When the oxygen content was below 0.03% by weight, there was substantially no oxide film; therefore, oxidation of silicon carbide or metallic silicon took place and dissolution in acid solution in a very small amount was confirmed. When the oxygen content in honeycomb structure exceeded 15% by weight, reduction in thermal conductivity was confirmed. This is considered to be caused by that metallic silicon was oxidized and the bonded areas between silicon carbide particles became SiO$_2$.

When attention is paid to the strength/Young's modulus ratios shown in FIG. 1, strength/Young's modulus ratio exceeds 1.5 when the oxygen content in honeycomb structure is 0.5% by weight or more; therefore, it is more preferable that the oxygen content is 0.5% by weight or more. As shown in FIG. 2, when the oxygen content exceeds 15% by weight, there is a reduction in thermal conductivity; this is believed to be due to that metallic silicon is oxidized and the bonded areas between silicon carbide particles become SiO$_2$. Incidentally, when the thermal conductivity of a honeycomb structure is 10 W/mK or less and such a honeycomb structure is used as a DPF, a very large thermal stress is generated and may cause, for example, the breakage of the honeycomb structure. Therefore, it is further preferable that the oxygen content in honeycomb structure is 10% by weight or less.

INDUSTRIAL APPLICABILITY

As described above, the silicon carbide-based porous body and honeycomb structure of the present invention contain refractory particles such as silicon carbide particles or the like and yet can be produced at a relatively low firing (sintering) temperature and, therefore, at a low production cost and at an increased yield; and can be provided inexpensively. Having an oxygen-containing phase at the surface of the silicon carbide particles and/or metallic silicon or in the vicinity of the surface, the silicon carbide-based porous body and honeycomb structure of the present invention have high thermal conductivity and are improved in oxidation resistance, acid resistance, chemical resistance to particulate and ash, thermal shock resistance, etc.; therefore, when used, for example, as a DPF and subjected to combustion of the particulates deposited thereon, for filter reactivation, there is no localized heat generation such as to damage the filter. Further, being porous, the present honeycomb structure can be suitably used as a filter for purification of automobile exhaust gas, a catalyst carrier, etc., even under a high SV condition.

Further, according to the present process for producing a silicon carbide-based porous body, an oxygen-containing phase can be formed preferably on the surface of the silicon carbide particles and/or the metallic silicon or in the vicinity of the surface according to a predetermined step and condition.

What is claimed is:

1. A silicon carbide-based porous body having a plurality of through channels defined by partition walls, characterized in that said body is a porous one that contains silicon carbide particles as an aggregate and metallic silicon, and has an oxygen-containing phase at the surfaces of silicon carbide particles and/or metallic silicon or in the vicinity of the surfaces thereof.

2. K silicon carbide-based porous body according to claim 1, wherein an oxygen content therein is 0.03 to 15% by weight.

3. A silicon carbide-based porous body according to claim 1, wherein the oxygen-containing phase is amorphous and/or crystalline SiO$_2$ or SiO.

4. A silicon carbide-based porous body according to claim 1, which satisfies the following relation; when the strength is taken as A (MPa) and the Young's modulus is taken as B (GPa).

5. A Silicon carbide-based porous body according to claim 2, wherein the oxygen-containing phase is amorphous and/or crystalline $SiO_2$ or SiO.

6. A silicon carbide-based porous body according to claim 2, which satisfies the following relation:

$$A/B \geq 1.3$$

when the strength is taken as A (MPa) and the Young's modulus is taken as B (GPa).

7. A silicon carbide-based porous body according to claim 5, which satisfies the following relation:

$$A/B \geq 1.3$$

when the strength is taken as A (MPa) and the Young's modulus is taken as B (GPa).

8. A silicon carbide-based porous body according to claim 5, which satisfies the following relation:

$$A/B \geq 1.3$$

when the strength is taken as A (MPa) and the Young's modulus is taken as B (GPa).

9. A honeycomb structure, characterized in that said structure is constituted by a silicon carbide-based porous body, wherein said body is a porous one which contains silicon carbide particles as an aggregate and metallic silicon, and has an oxygen-containing phase at the surface of silicon carbide particles and/or metallic silicon or in the vicinity of the surfaces thereof.

10. A honeycomb structure according to claim 9, wherein an oxygen content therein is 0.03 to 15% by weight.

11. A honeycomb structure according to claim 9, wherein the oxygen-containing phase is aznorphous and/or crystalline $SiO_2$ or SiO.

12. A honeycomb structure according to claim 9, which satisfies the following relation:

$$A/B \geq 1.3.$$

13. A process for producing a silicon carbide-based porous body, characterized by adding metallic silicon and an organic binder to raw material silicon carbide particles, mixing them, melding the mixture to a predetermined shape, calcinating the molded material in an oxygen-containing atmosphere to remove the organic binder in the molded material, and firing the calcinated material to obtain a silicon carbide-based porous body wherein an oxygen-containing phase is formed at the surface of the silicon carbide particles and/or the metallic silicon or in the vicinity of the surface.

14. A process for producing a silicon carbide-based porous body according to claim 13, wherein the firing is carried out in a temperature range of 1,410 to 1,600° C.

15. A process for producing a silicon carbide-based porous body, characterized by adding metallic silicon and an organic binder to raw material silicon carbide particles, mixing them, molding the mixture to a predetermined shape, calcinating the molded material to remove the organic binder in the molded material, firing the calcinated material, and subjecting the fired material to a heat treatment in an oxygen-containing atmosphere to obtain a silicon carbide-based porous body wherein an oxygen-containing phase is formed at the surface of the silicon carbide particles and/or the metallic silicon or in the vicinity of the surface.

16. A process for producing a silicon carbide based porous body according to claim 15, wherein the heat treatment is carried out in a temperature range of 500 to 1,400° C.

17. A process for producing a silicon carbide-based porous body according to claim 15, wherein the firing is carried cut in a temperature range of 1,410 to 1,600° C.

18. A process for producing a silicon carbide-based porous body according to claim 16, wherein the firing is carried out in a temperature range of 1,410 to 1,600° C.

19. A process for producing a silicon carbide-based porous body, characterized by adding metallic silicon and an organic binder to raw material silicon carbide particles, mixing them, molding the mixture to a predetermined shape, calcinating the molded material to remove the organic binder in the molded material, firing the calcinated material, then coating the surfaces of the silicon carbide particles and the metallic silicon with a fluid containing silicon and oxygen, thereafter subjecting the resulting material to a heat treatment to obtain a silicon carbide-based porous body wherein an oxygen-containing phase is formed at the surface of the silicon carbide particles and/or the metallic silicon or in the vicinity of the surface.

20. A process for producing a silicon carbide-based porous body according to claim 19, wherein the heat treatment is carried out in a temperature range of 50 to 1,400° C.

21. A process for producing a silicon carbide-based porous body according to claim 19, wherein the firing is carried out in a temperature range of 1,410 to 1,600° C.

22. A process for producing a silicon carbide-based porous body according to claim 20, wherein the firing is carried out in a temperature range of 1,410 to 1,600° C.

* * * * *